Figure 1:
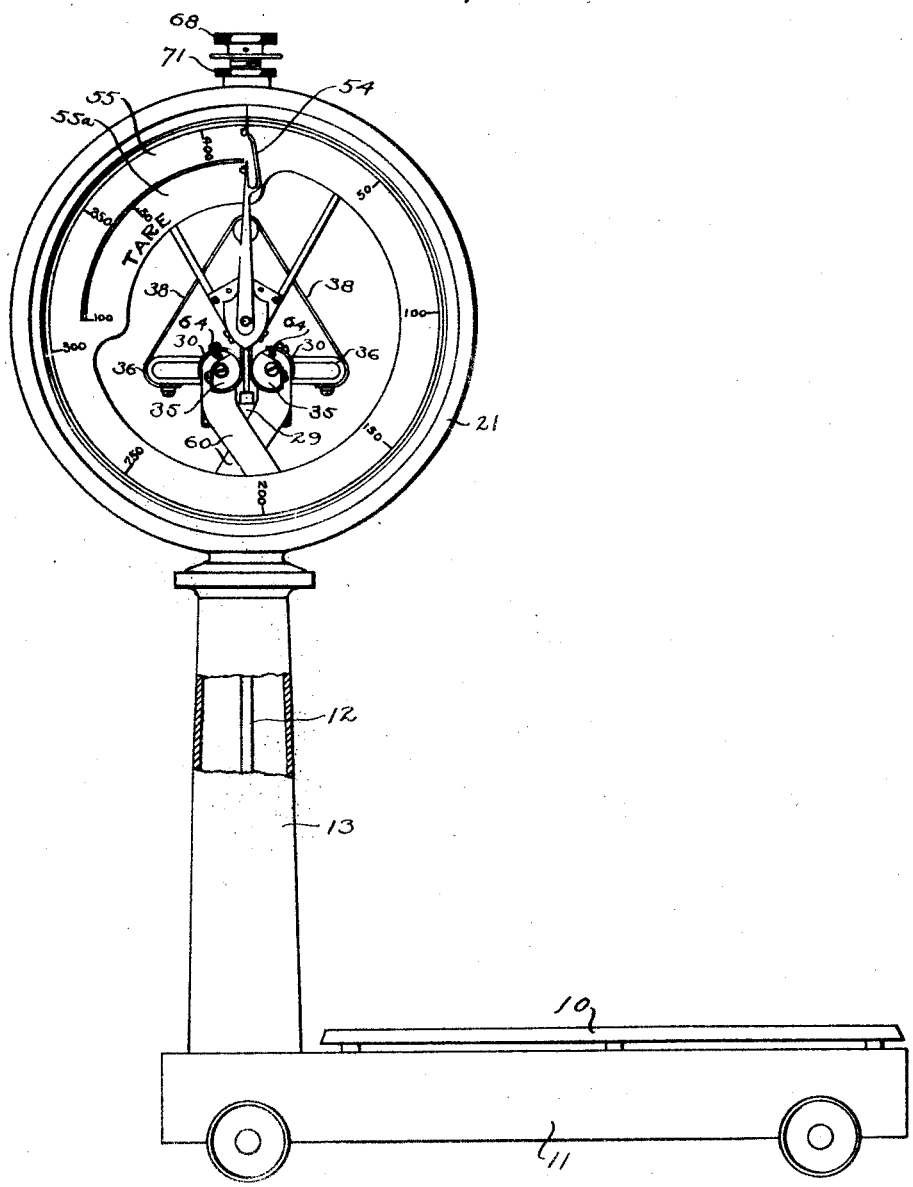

May 3, 1927.

L. A. OSGOOD ET AL

WEIGHING SCALE

Filed July 25, 1922

1,626,963

7 Sheets-Sheet 1

INVENTORS
Louis A. Osgood and
Elmer E. Wolf
BY Cooper, Kerr & Dunham
ATTORNEYS.

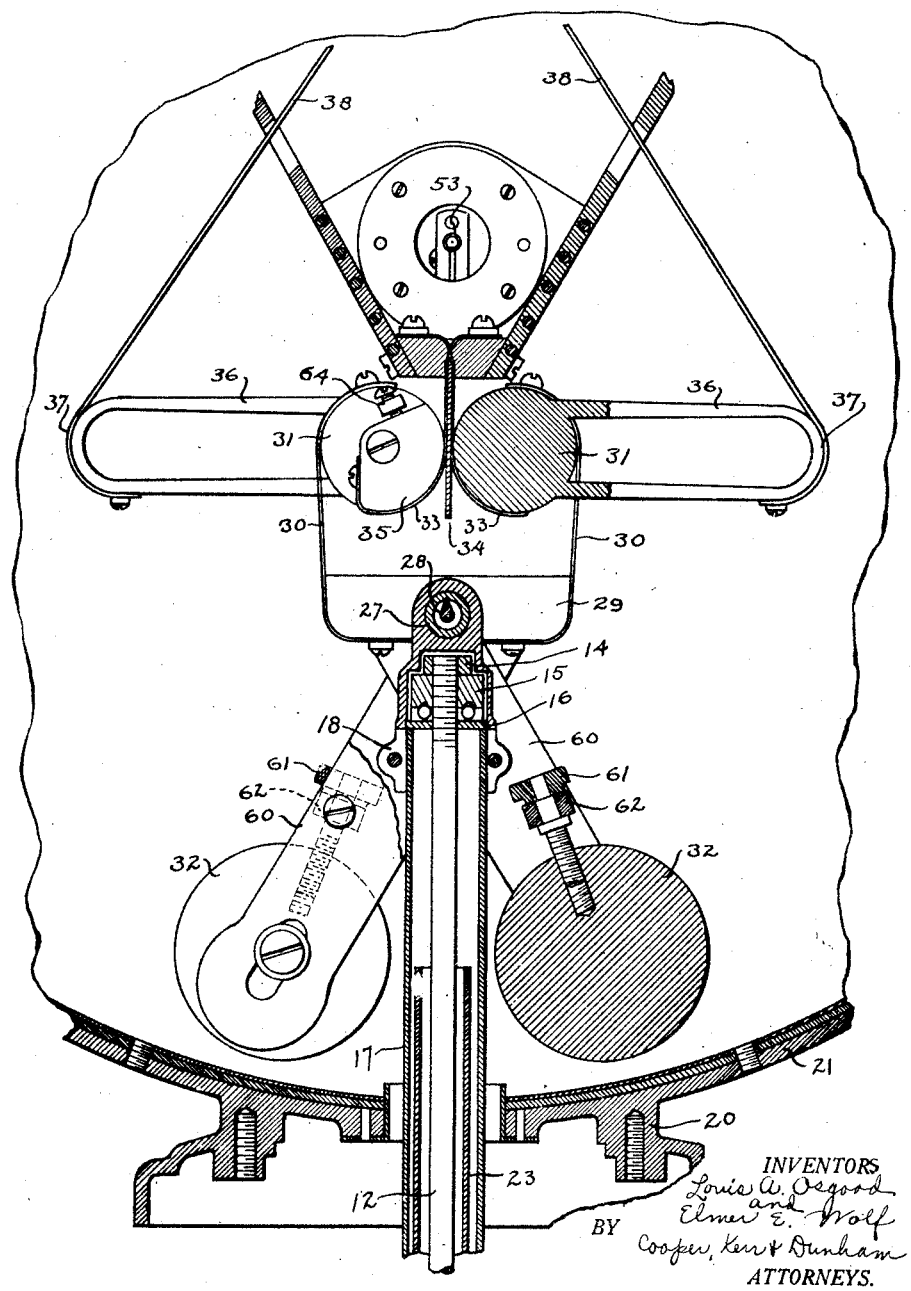

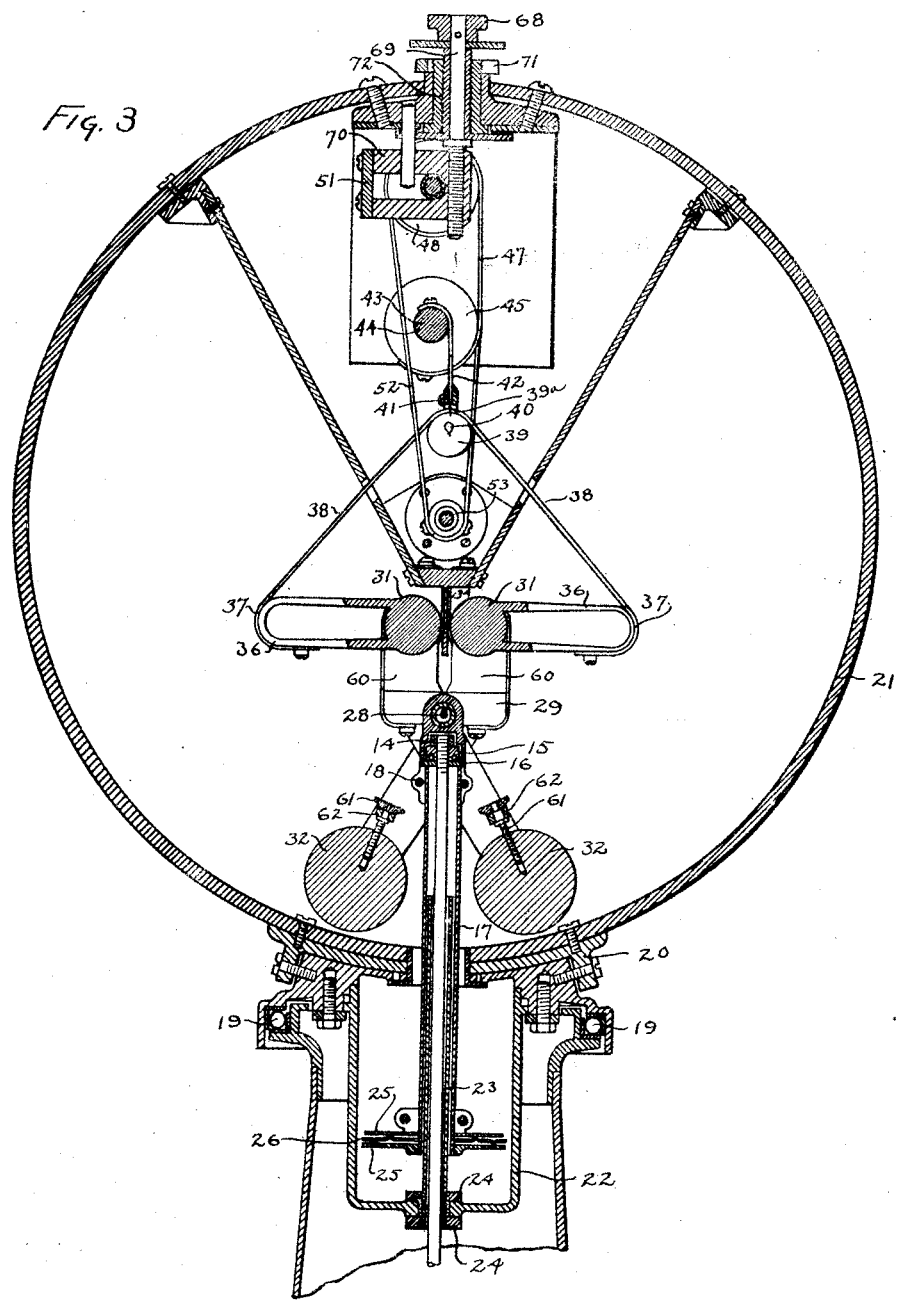

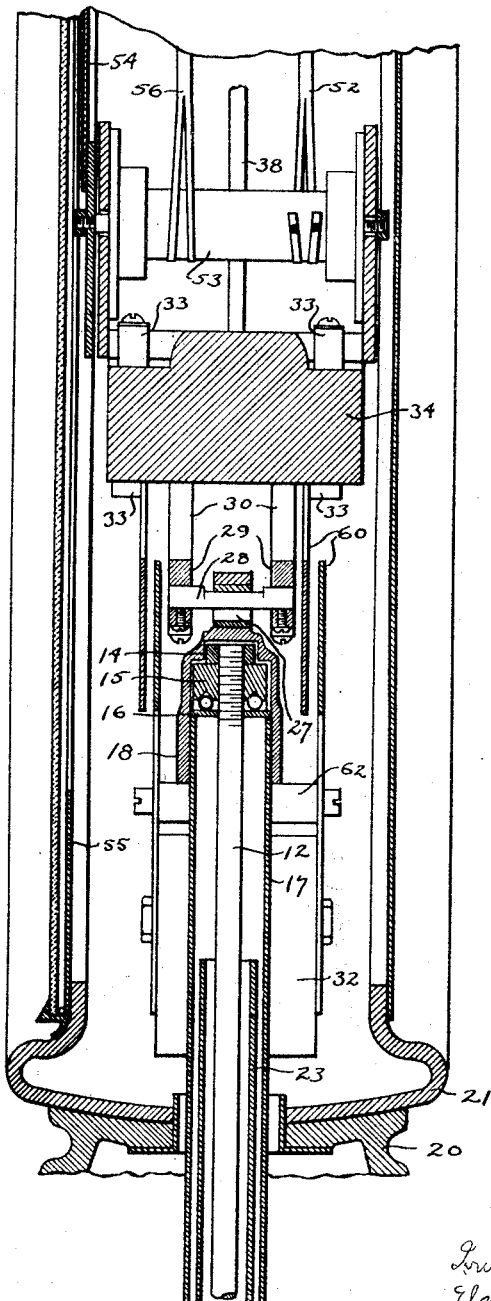

May 3, 1927. 1,626,963
L. A. OSGOOD ET AL
WEIGHING SCALE
Filed July 25, 1922  7 Sheets-Sheet 5
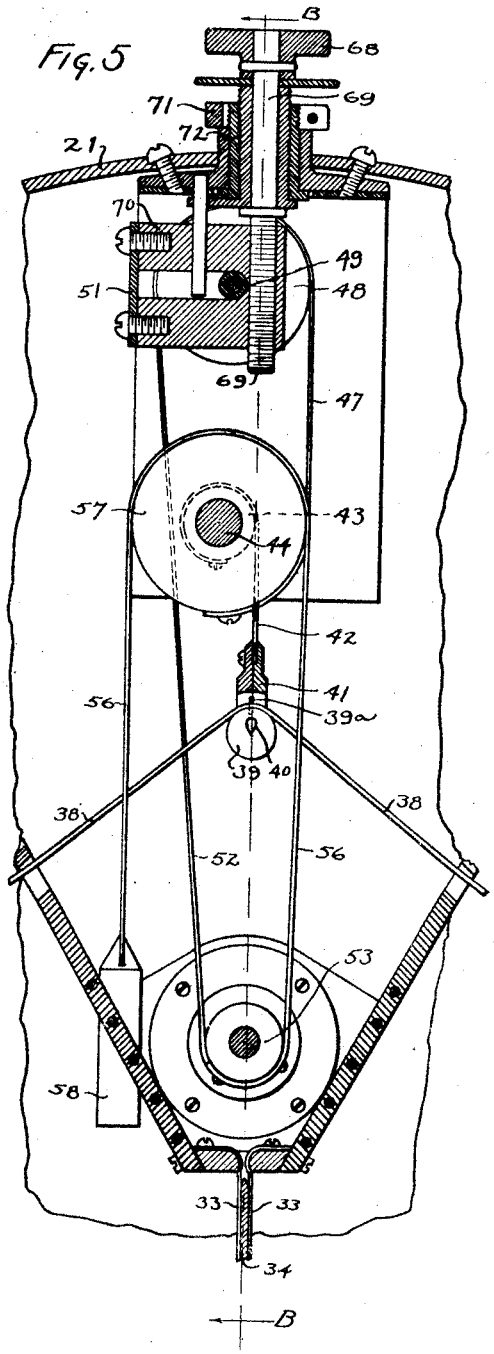
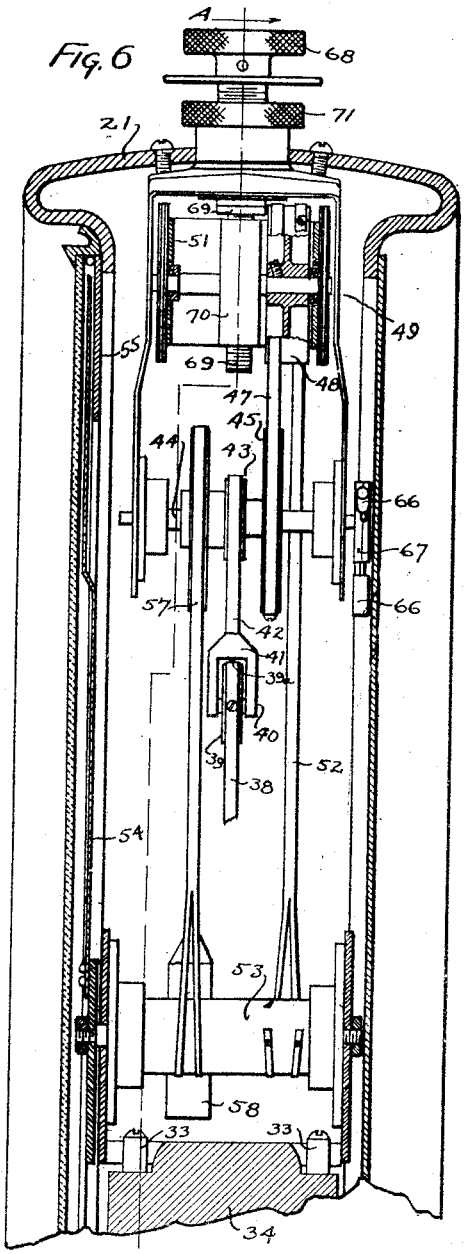
INVENTORS
Louis A. Osgood
and
Elmer E. Wolf
BY
Cooper, Kerr & Dunham
ATTORNEYS.

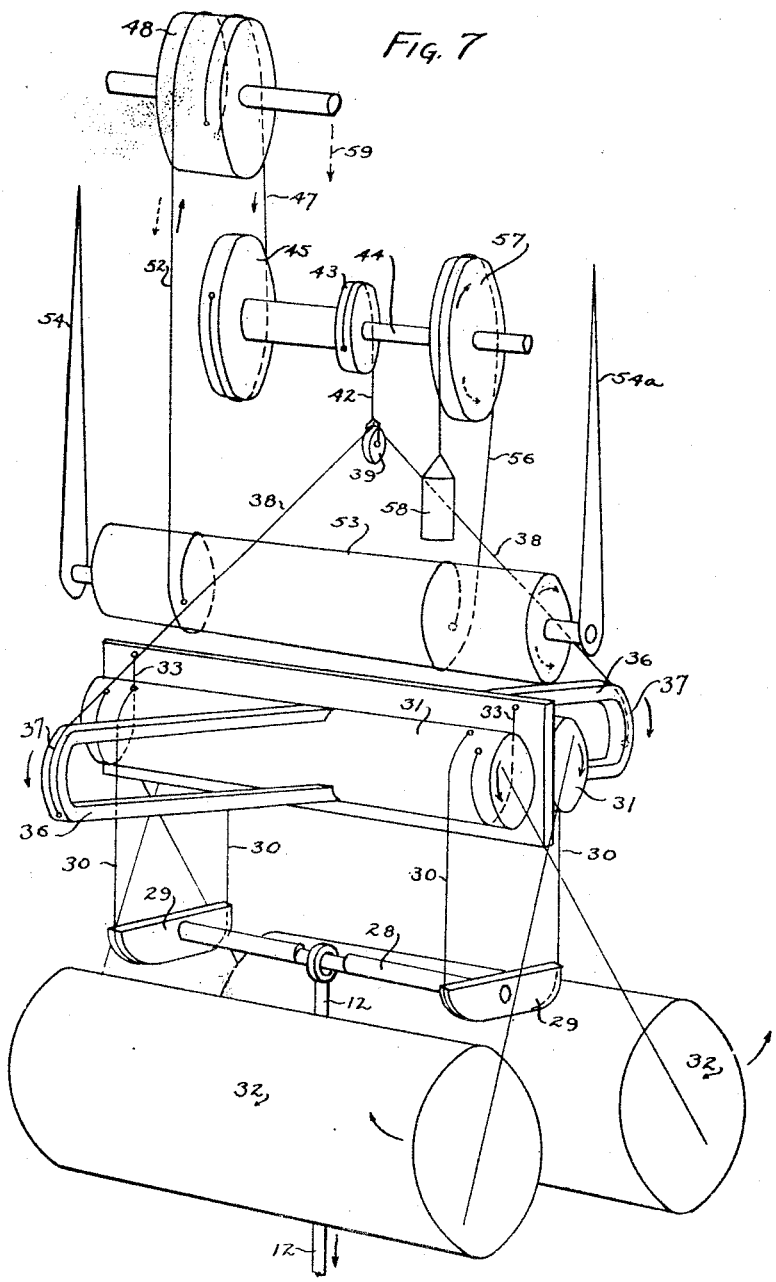

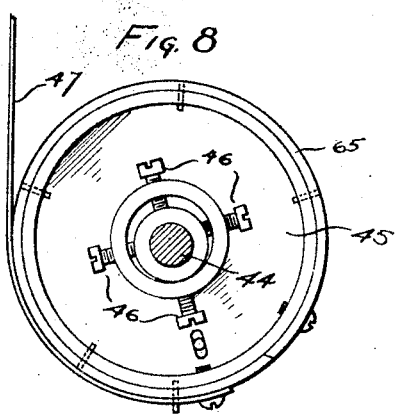
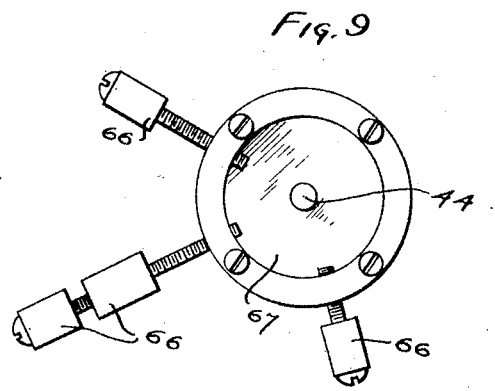
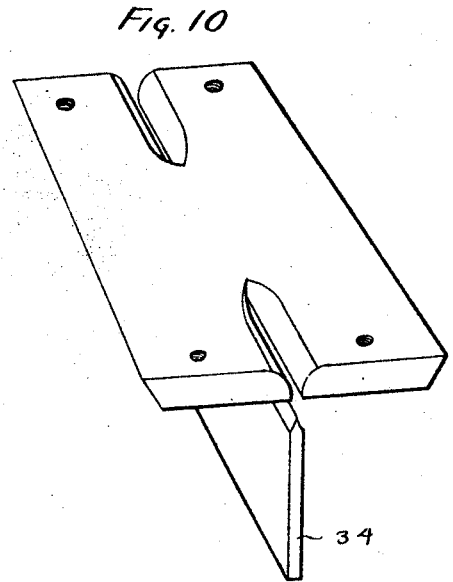
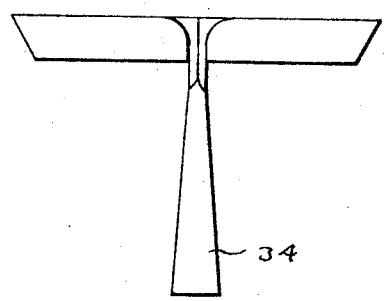
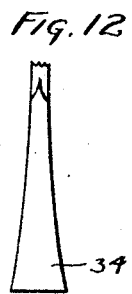

Patented May 3, 1927.

1,626,963

UNITED STATES PATENT OFFICE.

LOUIS A. OSGOOD, OF DAYTON, AND ELMER E. WOLF, OF SPRINGFIELD, OHIO, ASSIGNORS TO INTERNATIONAL SCALE COMPANY, OF DAYTON, OHIO, A CORPORATION OF ILLINOIS.

WEIGHING SCALE.

Application filed July 25, 1922. Serial No. 577,316.

This invention relates to improvements in scales and is more particularly directed to improvements in the general arrangement of the load counterbalancing devices, the weight indicator, the tare setting device, and to the general improvement of the scale as a whole, to the end that the scale may be more accurate, simple and more inexpensive to manufacture and assemble. Other detailed objects of the present improvement will be more fully set forth in the accompanying specification and claims.

In the drawings:

Fig. #1 shows an assembly view of the scale mounted upon a portable base.

Fig. #2 shows an enlarged elevational view, partly in section of the load counterbalancing system.

Fig. #3 is a view similar to Fig. #2 and shows the mounting of the counterbalancing devices and their connection to the indicator and tare setting device.

Fig. #4 is a vertical central section of certain of the parts shown in Fig. #3.

Fig. #5 is a detail sectional view of the tare setting and indicator driving devices. This view is taken on line A—A of Fig. #6.

Fig. #6 is a detail sectional view of the same parts taken on line B—B of Fig. #5.

Fig. #7 is a diagrammatic illustration of the pendulum load counterbalancing system including the flexible tape connections to the indicator devices and illustrating the means for effecting tare settings.

Fig. #8. is a detail of the compensating cam pulley.

Fig. #9 is a detail of the sealing disc.

Fig. #10 is a detail of the bearing plate or surface.

Figs. #11 and 12 are modifications of the bearing plate.

In more detail; 10 is the load support or platform, which is supported in the usual manner upon the base levers within the housing 11. From these base levers a steelyard 12 extends upwardly in the center of the pedestal 13 and at its upper end is suitably threaded into a ball retaining collar 15 and into a lock nut 14. The balls of the retaining collar rest upon an annular plate 16 which is supported on the top of a tube 17 and clamped there by means of a suitable socket and split casting 18. The parts just described form a swivel connection for the draft rod and permit the relative rotation of casting 18 with respect to the steelyard 12 when it is desired to rotate the entire housing of the scale.

The top of pedestal 13 is provided with a casting, having a ball race thereon, receiving balls 19 which, in turn, support a depending head 20 rigidly carried by dial housing 21. These parts form a turn table device and permit the relative rotation of the dial housing with respect to the pedestal.

With a rotatable dial housing of this sort it is necessary that a particular form of dash pot be employed. This comprises a dash pot cylinder 22 which is supported by casting 20 in any desired manner. This cylinder has a central threaded opening which receives an upstanding pipe 23, which pipe extends into the lower end of the pipe or tube 17. Suitable nuts 24 and proper packing are provided to clamp the pipe 23 in the dash pot cylinder 22. The plunger or piston of the dash pot is formed by two spaced plates 25 clamped to the lower end of pipe 17 and supporting between them a loose annular plate 26, having stuck up portions or nubs thereon to prevent sticking of the loose plate to one or the other of the supporting shoulder plates. This plunger construction permits the dash pot plunger to have free movement laterally in the cooperating cylinder and likewise a slight up and down movement to thereby provide the utmost freedom from friction and to minimize sticking and binding. The dash pot is axially mounted with respect to the center of rotation of the dial housing and having a central opening permits the steelyard 12 to extend through the center of the dash pot. At the same time the construction of the dash pot is such that it forms a seal and prevents the access of dust into the dial housing. It will be understood that the dial housing is closed up in the usual manner by glass plate, etc.

The casting 18 at its upper end is drilled to receive tube 27, which forms a bearing for knife edge 28, which knife edge is carried by evener bars 29. These bars are spaced apart and knife edge 28 bridges and connects them.

It will be understood that when the load is applied to the scale platform that parts 28, 29 are displaced directly in accordance with applied load.

The automatic load counterbalancing system will be described in connection with diagrammatic Figure 7 which shows by simple lines the arrangement of the parts and by the full line arrows the direction of movement of these parts under load counterbalancing operations. The dotted line arrows indicate the direction of movement of the parts during tare setting operation. Reference characters similar to those used in Figure 7 will be applied to other figures of the drawings.

Upon the application of a load the draft rod 12 will be pulled downwardly drawing the eveners 29 downwardly to an extent proportional to the applied load. These eveners 29 are suspended by four flexible tapes 30 which have wrapped connections about substantially circular hubs 31 so as to rotate them in the direction of the arrows upon application of a load. The circular hubs 31 have proper curved rolling surfaces to receive the flexible load transmitting tapes. Adjustably fastened to the hubs 31 are members 35 having curved rolling surfaces receiving flexible suspension tapes 33. These latter tapes are wrapped about the supplementary hub portions 35 and cooperate with a bearing plate 34 which is disposed between the tapes from one hub portion and the tapes from the other hub. Also fastened to the hubs are pendulums 32 having their stems relatively crossing each other as shown. Upon the application of a load the eveners 29 draw downwardly upon tapes 30 causing the pendulum 32 to swing outwardly and upwardly and causing tapes 33 and 30 to unroll from their cooperating rolling surfaces. Rigid with the hubs are arms 36 which, upon application of a load, swing in the direction indicated by the arrows. These arms 36 have arcuate end portions 37 about which there is wrapped and fastened a tape 38 which, in turn, extends upwardly and passes over a roller 39. Roller 39 carries a knife edge 40 supported in a loop bearing 41 which in turn is fastened to a tape 42. Upon the application of a load, arms 36 draw downwardly upon tape 38 and thereby draw downwardly on the tape 42. The angular arrangement of tape 38 over its pulley and the crossed arrangement of the pendulum stems serve to maintain the pendulum hub portions in proximity to each other and adjacent the intermediate bearing plate 34. The crossed arrangement of the pendulum stems further provide a very compact arrangement for this pendulum system.

When a load is applied and tape 42 drawn downwardly this tape will rotate a pulley 43 in the direction of the arrow. The tape 42 is wrapped about and fastened to this pulley. Pulley 43 in turn is fixed to a shaft 44 which is rotatably mounted in suitable bearings carried by the frame of the machine. These bearings are preferably of the type shown in the application of Elmer E. Wolf, Serial No. 371,859. Also fixed to shaft 44 is a compensating cam disc 45. The eccentricity of this cam and its compensating action is preferably adjustable with respect to shaft 44 by means of the adjustment screws 46 best shown in Figure 8. The purpose of this compensating cam disc is to provide for equal increments of indicator movement for equal increments of the applied load. If the compensating pulley were omitted the graduations on the indicating dial would have to be irregularly spaced, which is undesirable. Wrapped about and fastened to cam 45 is a tape 47 which extends upwardly and is wrapped around and fastened to a disc or pulley 48. This pulley 48 is fastened to a shaft 49 which, in turn, is suitably supported in disc bearings carried by frame 51. Upon the application of a load the disc or pulley 48 is rotated in the direction of the full line arrows, thereby drawing upwardly upon a tape 52 which is wrapped around and fastened to said pulley. From pulley 48 the tape 52 extends downwardly and its lower end has a wrapped connection to the indicator driving hub or pulley 53. The tape 52 is wrapped more than once about the periphery of hub 53 and is therefore bifurcated, as shown in Figure 6, to prevent its rolling up upon itself.

A suitable pivotal indicator 54 is fastened to one end of the hub or pulley 53 and the shaft carrying this up is suitably mounted in suitable bearings carried by the frame of the machine. The arrangement of hub 53 readily provides for adjustment of indicator at both ends thereof. A supplementary indicator is shown at 54ª in Figure 7. The indicator 54 sweeps over the usual graduated load dial 55, which dial is fastened in any desired manner in the dial housing. Wrapped about and fastened to pulley 53 is a flexible tape 56. This tape is also bifurcated to permit a multiple wrapping about the pulley 53. Tape 56 extends upwardly and is wrapped about the pulley 57, which pulley is loosely mounted upon shaft 44. The extended end of this tape is provided with a suitable gravity weight 58. Upon the application of a load, tape 52 will rotate pulley 53 in the direction of the full line arrows, thereby drawing down on the tape 56, rotating loose pulley 57 and elevating weight 58. In this way the indicator 54 is displaced in accordance with the load. Upon the removal of the applied load, the gravity weight 58 serves to return the indicator to zero and takes up any slack in the tape system.

The foregoing has described the displacement of the indicator for an applied load counterbalancing operation. In weighing scales it is also necessary to provide for tare operations in which a receptacle is placed upon the platform and balanced off in some manner. In some cases the weight of this receptacle is known in advance and the scale is set for this weight, and in other cases the weight of the receptacle is an unknown amount and is determined after the commodity is unloaded therefrom. The construction herein illustrated will take care of either of these tare operations as will be readily understood by those skilled in the art.

To provide for the tare a tare dial 55ª is provided, which dial is concentric with the the load dial and which has its zero coinciding with zero on the load dial. The last graduation on the load dial coincides with zero and the tare numerals extend in a reverse direction back from zero to those designated in direct loads. With this tare dial arrangement there is no free space back of zero such as is usually used for tare dial markings. Both dials are concentric and indicator 54 is provided with multiple index portions to align with either tare dial 55ª or load dial 55.

To adjust the scale for tare the relative relation of indicator 54 with respect to counterbalancing system is changed. This is effected by lowering disc 48 from its normal position. The lowering of the disc or pulley 48 is effected by means to be hereinafter described. It is sufficient here to state that the disc is lowered as indicated by dotted line arrow 59 in Figure 7.

Upon lowering of pulley 48 fixed pulley 45 does not rotate but tape 47 winds up upon pulley 48 (see dotted line arrow) causing tape 52 to unwrap from the pulley 48 and to wrap up further upon the hub or pulley 53. Rotation of the pulley 53 under these conditions is effected by the lowering of the gravity weight 58 which turns loose pulley 57 anti-clockwise and draws up tape 56 causing this tape to be unwrapped from hub 53. This operation rotates hub 53 and displaces indicator hand 54 back from zero to the proper point upon the tare dial, or to the zero point upon the main load dial, as the case may be. By setting the tare in this manner, there will be no lowering or swinging of the pendulum system whatsoever, since pulley 45 does not rotate and consequently fixed pulley 43 does not rotate. The above construction permits the setting of the tare by the relative adjustment of the indicating device with respect to load counterbalancing system without displacing the latter. This means of tare setting further obviates the necessity of displacing dials from their normal position as heretofore been the practice. With the present construction the pendulum system remains in the position which it has assumed under the tare load and it is not displaced at all during a setting or adjustment.

The foregoing has explained the general operation of the automatic load counterbalancing system and indicator drive and tare adjustment. There are certain specific details of construction which may be explained in further detail.

The pendulum weights 32 are adjustable upon their stems 60 by means of slots therein and adjustment screws 61 carried by cross bars 62 connecting the stems. The cross stem arrangement permits the pendulum weights to be disposed substantially in the same plane and closely adjacent each other. This result is secured by locating the plates which form stems closely adjacent each other as shown in Figure 4.

The suspension hubs 35 are adjustable relatively to the hubs 31 to control the initial position of the pendulums by means of adjustment screws 64.

Sealing of the scale is effected by varying the eccentricity of the compensating cam or disc 45 relatively to shaft 44 by means of the adjustment screws 46. A further change of this cam may be secured by shaping the periphery of the cam and for this purpose the rim 65 thereof is removable as shown in Figure 8.

An additional adjustment used in sealing the scale is secured by adjusting sealing weights 66 in and out relative to the disc 67 which disc is fixed to shaft 44. (See Figures 6 and 9.)

Adjustment devices include setting knob 68 projecting up from the top of the dial housing and having a depending stem 69 which is threaded into a block 70 attached to supporting frame 51. By turning this knob in the proper direction pulley 48 may be raised or lowered as desired.

Zero adjustment of the scale indicator is secured by means of supplementary setting knob 71 which is threaded to receive a threaded collar 72 surrounding the upper unthreaded end of stem 69. By adjusting this knob the frame 51 may be raised or lowered to bring indicator 54 to the exact zero point on dial 55.

By the provision of the flexible tape connections intermediate the pendulum load counterbalancing means, the objectionable rack and pinion heretofore used at this point is eliminated. The proper multiplication between the pendulum and indicating device is secured by making the wheel 43 of less diameter than pulley 45. By proper varying diameter of the small and large pulleys any desired multiplication may be secured. The equalizer arrangement and the pendulum suspension permits the scale to be used on surfaces that are not exactly level and readily lends itself to portable scale construction in which a scale is moved from place to place from time to time.

The construction further provides for elimination of friction and drag in the parts and minimizes the use of knife edges and like parts which are subject to wear.

Providing a pendulum load counterbalancing system which is not displaced during a tare setting or zero adjustment setting, as herein described, the variation of the initial position of the pendulum angle or, in other words, the balanced position thereof is maintained under all conditions. In this way the variation of pull exerted by the pendulums in their different positions is the same whether the tare adjustment or zero adjustment has been effected or not.

In the present construction the provision of the extended arms 36 exerts a compensating effect as the load is applied. These arms as they rock provide an increasing angularity with respect to tape 38 thereby offsetting the loss of the pendulum resisting power as the pendulums swing outward.

In order to provide for the maintaining of the proper pendulum action when the pendulums are out of level, it has been found preferable to fasten the tape 38 to the pulley 39 at the top thereof. It is preferably secured by extending a small pin 39ᵃ through the tape into pulley 39. This pin maintains knife edge 40 in a vertical position irrespective of slight displacements of the pendulum. It also serves to impart a displacement of one pendulum caused by an out of level position to the other pendulum in an equal amount in the opposite direction. This arrangement maintains proper pendulum action under varying level conditions of the device. The construction just described furthermore tends to prevent the synchronous movement of the pendulums and prevents any swinging movement thereof being transmitted to the pivotal indicator since the motion of the pendulums in any back and forth swinging direction is absorbed on knife edge 40.

We claim—

1. A pendulum load counterbalancing means for a weighing scale comprising in combination, a pair of pendulums having hub portions for said pendulums, a bearing member intermediate said hub portions, a flexible suspension means wrapped upon said hub portions and cooperating with said bearing member, and load transmitting flexible members wrapped upon said hub portions in an opposite direction to the aforesaid suspension means, and a common load transmitting element to which said last mentioned flexible members are connected.

2. A weighing scale comprising in combination, a pedestal, a head portion carrying the load counterbalancing means and indicating device, a draft rod extending into said head portion and a turn-table device including a bearing plate carried by the head portion, a rotatable connection in said draft rod including a plate-like member and ball bearings resting upon the aforesaid plate for permitting the turning of the head relatively to the pedestal without disturbing the indication of the scale.

3. A weighing scale including, a pivotal indicator, an automatic load counterbalancing means and a load indicating dial, said dial having its last graduation coinciding with zero, and a tare dial having its zero coinciding with the zero of the load dial and having its numerals progressively increasing upon the opposite side of zero from those on the load dial.

4. In a weighing scale in combination with a load support, a double pendulum load counterbalancing system, flexible suspension means therefor and flexible driving connections therefor from said load support, said connections having provisions to impart a direct uncompensated driving movement to the pendulums, an indicator and operating connection including compensating means intermediate the pendulums and said indicator said compensating means including a cam and a flexible tapelike member wrapped thereupon and co-operating therewith to effect the compensating motion.

5. In a weighing scale in combination with a pendulum load counterbalancing system, an indicating device, means for driving said indicating device from said pendulum system, said means including flexible tape like members and cooperating pulley means, said pulley means including a compensating cam pulley to provide equal increments of indicator movement for equal increments of applied load.

6. The invention set forth in claim 5 in which the compensating cam pulley is adjustable to vary the compensating action thereof.

7. In a weighing scale, in combination with a pendulum load counterbalancing system, indicating devices, means for driving said indicating devices from said pendulum system, said means including flexible tape connections and cooperating movement multiplying pulley members rotating in unison upon a common axis.

8. In a weighing scale, in combination with a pendulum load counterbalancing system, indicating devices, means for driving said indicating devices from said pendulum system, said means including flexible tape connections and cooperating multiple pulley devices of proper diameter to effect a desired multiplication of movement said pulley members being secured together to rotate to equal angular extents.

9. In a weighing scale, in combination with a pendulum load counterbalancing system, indicating devices, means for driving said indicating devices from said pendulum system, said means including flexible tape connections and cooperating pulley like members, certain of pulley like members having a compensating cam action upon said movement transmitting tapes for the purpose described, the aforesaid indicating devices being mounted upon an axis separate from that of the compensating cam member and adapted for rotatable movement.

10. In a weighing scale, in combination with a flexibly suspended pendulum load counterbalancing system, indicating devices and a flexible tape-like operating connection intermediate to said pendulum system and indicating devices.

11. In a weighing scale, in combination with pendulum load counterbalancing means, indicating devices, operating connections intermediate said pendulum means and said indicating devices, and adjusting means for effecting a relative shifting movement of said indicator devices with respect to said pendulums, said connections including flexible tape means.

12. A load counterbalancing means for a scale, comprising in combination with means displaced directly in accordance with applied load, of a flexibly suspended pair of pendulums, of flexible pendulums displacing means connected with the aforesaid load displaced means, said pendulums having their stems relatively crossing each other whereby space is minimized and the gravity of the pendulums is utilized to maintain the hub portions of the pendulums in proximity.

13. A load counterbalancing means for a scale, comprising in combination with means displaced directly in accordance with applied load, a floating rotating member carrying a pendulous weight, means for rotating said rotatable means from the aforesaid means in opposition to the resistance of the pendulous weight, a flexible suspension for said rotatable member wrapped thereon and a flexible member cooperating with said rotatable member for transmitting the movement thereof to indicating devices.

14. A pendulum load counterbalancing means for a weighing scale, comprising in combination with a part displaced by the applied load, a bearing member, a pair of pendulums having their hub portions upon each side of said bearing member, curved rolling surfaces associated with said hub portions, flexible suspension members for said pendulums cooperating conjointly with said bearing member and said rolling surfaces, and flexible load transmitting means connected with the load displaced part and said rolling surfaces to displace said pendulums upwardly and outwardly and hub portions thereof downwardly upon the application of a load.

15. A weighing scale, comprising, in combination, a pendulum load counterbalancing means, a load indicating means connected to said pendulum means, a load support, and means for relatively shifting the relation of said pendulum counterbalancing means with respect to said load indicating means without displacing said pendulum means for the purpose described.

16. An automatic load counterbalancing and indicating device for a weighing scale comprising in combination with pendulum load counterbalancing means, a pivotal indicator, flexible connections intermediate said pendulum load counterbalancing means and said indicator, a receiving surface associated with said pendulum counterbalancing means for actuating said flexible connections, and wheels of varying diameter cooperating with said intermediate flexible connections to give the desired multiplication of drive to said indicator.

17. A pendulum load counterbalancing system for a weighing scale, including a plurality of flexibly suspended pendulums flexible connections intermediate said pendulums, and a part adapted to be displaced by the applied load, said pendulums having their stems extending in a direction to relatively cross each other to thereby tend to maintain the position of the pendulums.

18. In a pendulum load counterbalancing system for a weighing scale, comprising a pair of pendulums each pendulum having an extended arm portion, a pair adapted to be variably displaced in accordance with the displacement of the pendulums, means including a single looped tape connection extending from said arm portions to said part, said means changing in relative angularity with respect to said arm portions as pendulums swing outwardly whereby the varying pendulum resistance is compensated for by the varying angular relation of said means and pendulum arm.

19. An automatic load counterbalancing mechanism, an indicator driving means for a weighing scale comprising in combination, a pair of flexibly supported pendulums, said pendulums having flexible element receiving surfaces associated therewith, flexible members associated with certain of said surfaces for driving and displacing said pendulums, and flexible means associated with and actuated by other of said surfaces for actuating the indicator driving means.

20. An automatic load counterbalancing mechanism, an indicator driving means for a weighing scale comprising in combination with the indicator driving means of a pair of flexibly supported pendulums, said pendulums having flexible element receiving surfaces associated therewith, an evener device actuated by the applied load, flexible members associated with certain of the aforesaid surfaces on said pendulum means and with said evener device for driving and displacing said pendulums, and a flexible means associated with and actuated by other of the aforesaid surfaces for actuating the indicator driving devices.

21. An automatic load counterbalancing mechanism, an indicator driving means for a weighing scale comprising in combination with said indicator driving means of a pair of flexibly supported pendulums, said pendulums having flexible element receiving surfaces associated therewith, flexible members associated with certain of said surfaces for driving and displacing said pendulums under the influence of applied loads, and connections from said pendulums to said indicator driving means, said connections including flexible connections and a compensating cam to provide equal increments of indicator travel with equal increments of applied load.

22. An automatic load counterbalancing means for a weighing scale comprising a plate-like support flexible suspension members depending therefrom and supported thereby, a pair of pendulums having hub portions connected to said flexible suspension members by wrapped connections, a second pair of flexible suspension members oppositely wrapped upon said hub portions and connected thereto and depending therefrom, an evener member connected to said suspension members, and a load supporting member connected to said evener member, an indicator, and means intermediate said pendulums and indicator for driving the latter and compensating for the variation in the load offsetting force of the pendulums.

23. In a weighing scale in combination with a flexibly suspended pendulum load counterbalancing system, indicating devices and flexible tape like connections intermediate said pendulum system and the indicating devices, said connections including compensating means for compensating for the angularity of the pendulums and for providing equal increments of indicator movement for equal increments of applied load.

24. In a weighing scale in combination with a pendulum load counterbalancing means having means for displacing the same from a load support, indicating devices, and means comprising a flexible member and an adjustable compensating cam means which is independent of the means for displacing the pendulums, for providing equal movements of the indicator in accordance with equal increments of applied load.

25. A weighing scale comprising a load counterbalancing means, means for operating the same from a load support, indicator devices and means driving the same from said load counterbalancing means, said last mentioned means including an adjustable compensating cam and a cooperating flexible element to provide variable adjustments of indicator travel while maintaining fixed travel relations between the load counterbalancing means and the means for operating the same.

26. A weighing scale comprising in combination, a pair of co-operating load counterbalancing pendulums, a pivotal indicator, and means for driving the said indicator by and upon the displacing of the pendulums, said means including a member mounted for a rocking movement upon an axis separate from that of the pivotal indicator, flexible connections operatively inter-connecting said pendulums and said rocking member to rock the latter upon the displacement of the pendulums, and operating connections extending from said rocking member to the aforesaid pivotal indicator for turning the latter upon the rocking of said member.

27. The invention as set forth in claim 26 in which each of the pendulums is provided with a segmental surface to receive the flexible connection.

28. A weighing scale including in combination a pair of load counterbalancing pendulums, a pivotal indicator, and means for operating the indicator from the said pendulums upon the displacement of the latter, said means including an operating means disposed upon an axis different from that of the pivotal indicator and flexible connections and movable co-operating surfaces upon some of which surfaces the flexible connections wrap on with simultaneously unwrapping of the flexible connections from other surfaces and vice versa upon displacement of the pendulums in one direction or another.

29. A weighing scale including in combination a pair of load counterbalancing pendulums, each having a curved surface thereon, a flexible tape co-operating with said surface, a pivotal mounted operating member, means for turning said operating member by and upon displacement of said flexible tape by the movement of the pendulums, a pivotal indicator mounted for turning movement upon an axis parallel with and separate from the axis of said operating member, and means for turning the indicator by and upon the turning of the operating member.

30. A load counterbalancing and indicating device for a weighing scale including in combination a pivotal indicator, a pivotally mounted indicator operating means disposed upon an axis separate from that of the indicator, inter-connecting means for turning the indicator upon turning of the operating means, a pair of load counterbalancing pendulums, each provided with a curved tape receiving surface, and means inter-connecting the pendulums and the indicator operating means, said means including tape connections co-operating with the aforesaid curved tape receiving surface of the said pendulums.

31. A load counterbalancing and indicating device for a weighing scale including in combination a pivotal indicator, a pivotally mounted operating means disposed upon an axis separate from that of the indicator, inter-connecting means for turning the indicator upon turning of the operating means, a pair of load counterbalancing pendulums each provided with an operating arm, and means connecting each of said arms with said indicator operating means to turn the latter upon the conjoint displacement of the pendulums.

In testimony whereof we hereto affix our signatures.

LOUIS A. OSGOOD.
ELMER E. WOLF.